United States Patent

Matsumoto et al.

(10) Patent No.: US 8,127,709 B2
(45) Date of Patent: Mar. 6, 2012

(54) IMAGE FORMING APPARATUS AND FOAM APPLICATION DEVICE

(75) Inventors: Kazuyoshi Matsumoto, Tokyo (JP); Minori Ichimura, Tokyo (JP); Shinji Imoto, Tokyo (JP); Manabu Izumikawa, Tokyo (JP); Yasuhisa Kato, Kanagawa (JP); Yasuo Katano, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 623 days.

(21) Appl. No.: 12/328,440

(22) Filed: Dec. 4, 2008

(65) Prior Publication Data

US 2009/0151625 A1 Jun. 18, 2009

(30) Foreign Application Priority Data

Dec. 12, 2007 (JP) ................................. 2007-320912

(51) Int. Cl.
*B05C 1/08* (2006.01)

(52) U.S. Cl. ........ 118/249; 118/257; 118/264; 347/104; 347/106; 101/416.1; 101/424.2

(58) Field of Classification Search ................ 118/58, 118/100–104, 249, 257, 264; 347/104, 106; 101/416.1, 424.2
See application file for complete search history.

(56) References Cited

U.S. PATENT DOCUMENTS

| | | | | |
|---|---|---|---|---|
| 5,088,407 A * | 2/1992 | Helm et al. | ............ | 101/352.01 |
| 5,771,054 A | 6/1998 | Dudek et al. | | |
| 6,036,898 A * | 3/2000 | Sulzbach et al. | ............ | 264/51 |
| 6,257,716 B1 | 7/2001 | Yanagawa et al. | | |
| 6,402,317 B2 | 6/2002 | Yanagawa et al. | | |
| 6,439,713 B1 | 8/2002 | Noguchi et al. | | |
| 6,623,816 B1 | 9/2003 | Tanikawa et al. | | |
| 6,837,578 B2 | 1/2005 | Tanikawa et al. | | |
| 7,070,269 B2 * | 7/2006 | Tanikawa et al. | ............ | 347/103 |
| 7,334,858 B2 | 2/2008 | Kogure et al. | | |
| 2004/0231556 A1 * | 11/2004 | Shimomura et al. | ........ | 106/31.43 |
| 2006/0055754 A1 | 3/2006 | Sakuma et al. | | |
| 2006/0164491 A1 | 7/2006 | Sakuma et al. | | |
| 2006/0270745 A1 * | 11/2006 | Hunt et al. | ............ | 521/50.5 |
| 2007/0103532 A1 | 5/2007 | Imoto et al. | | |
| 2007/0243483 A1 * | 10/2007 | Katano et al. | ............ | 430/124.21 |
| 2008/0106566 A1 | 5/2008 | Kogure et al. | | |

FOREIGN PATENT DOCUMENTS

| | | |
|---|---|---|
| JP | 8-323977 | 12/1996 |
| JP | 2002-137378 | 5/2002 |
| JP | 2005-138502 | 6/2005 |

* cited by examiner

*Primary Examiner* — Laura Edwards (74) *Attorney, Agent, or Firm* — Cooper & Dunham LLP (57) ABSTRACT

A disclosed image forming apparatus includes an image forming unit configured to form an image on a recording medium; and a foam application unit configured to apply foam generated by foaming a liquid and/or a gel onto the recording medium. The foam application unit includes an application part configured to apply the foam onto the recording medium, a supply opening configured to supply the foam to the application part, and a spreading part configured to spread the foam on the application part. The spreading part is disposed at an angle with respect to the movement direction of the application part; and the supply opening is disposed near the most upstream portion of the spreading part with respect to the movement direction of the application part.

11 Claims, 6 Drawing Sheets

IMAGE FORMING APPARATUS AND FOAM APPLICATION DEVICE

BACKGROUND OF THE INVENTION

1. Technical Field

This disclosure generally relates to an image forming apparatus and a foam application device.

2. Description of the Related Art

A liquid-jet image forming apparatus such as an inkjet recording apparatus uses one or more recording heads that jet liquid droplets (e.g., ink droplets) to form an image. A liquid-jet image forming apparatus is used, for example, for a printer, a facsimile machine, a copier, a plotter, or a multi-function copier having functions of them. Such a liquid-jet image forming apparatus jets liquid droplets from its recording heads onto paper (not limited to a sheet of paper but also refers to any medium, such as an OHP sheet, to which ink droplets or other liquid droplets can adhere, and may also be called a recording medium, recording paper, recording sheet, etc.), and thereby forms (records or prints) an image on the paper. There are roughly two types of liquid-jet image forming apparatuses: a serial-type image forming apparatus including a recording head that jets liquid droplets while moving in the main-scanning direction to form an image; and a line-type image forming apparatus including a line-type recording head that does not move when jetting liquid droplets to form an image.

In the present application, an image forming apparatus refers to an apparatus that forms an image by jetting a liquid onto a recording medium made of paper, thread, fabric, textile, leather, metal, plastic, glass, wood, ceramic, etc. Also, "image forming" indicates not only a process of forming a meaningful image such as a character or a drawing on a recording medium, but also a process of forming a meaningless image such as a pattern on a recording medium (or just jetting liquid droplets onto a recording medium). Further, in the present application, "ink" refers not only to a colored liquid for drawing or printing but also to any substance that is to be jetted in the form of liquid. For example, "ink" may refer to a DNA specimen, a resist, or a pattern material.

There are known problems in forming an image by jetting ink droplets including color materials using a liquid-jet image forming apparatus. Such problems include "feathering" where edges of dots formed by ink droplets become jagged; "color bleeding" where adjacent ink droplets jetted onto paper and having different colors mix together and the color boundaries are blurred; and "long time" necessary for ink droplets jetted onto paper to dry.

Several methods have been developed to solve the above problems. In a method disclosed in patent document 1, a heating unit is used after and/or before printing to prevent bleeding of ink and to accelerate drying of the ink.

[Patent document 1] Japanese Patent Application Publication No. 8-323977

In a method disclosed in patent document 2, a pretreatment liquid that reacts with ink and prevents bleeding is applied by an application roller to paper. Also, in a method disclosed in patent document 3, a pretreatment liquid is applied to paper by jetting a mist of the pretreatment liquid from a liquid-jet head.

[Patent document 2] Japanese Patent Application Publication No. 2002-137378

[Patent document 3] Japanese Patent Application Publication No. 2005-138502

However, adding a heating unit to an image forming apparatus as in patent document 1 increases the power consumption of the image forming apparatus. Meanwhile, with a method of applying a pretreatment liquid using an application roller or a liquid-jet head as disclosed in patent document 2 or 3, it is difficult to evenly apply the pretreatment liquid on paper. Also, the pretreatment liquid takes a long time to dry after reacting with ink on the paper and causes the paper to curl or warp, and this in turn increases the likelihood of paper jam.

BRIEF SUMMARY

In an aspect of this disclosure, an image forming apparatus includes an image forming unit configured to form an image on a recording medium; and a foam application unit configured to apply foam generated by foaming a liquid and/or a gel onto the recording medium. The foam application unit includes an application part configured to apply the foam onto the recording medium, a supply opening configured to supply the foam to the application part, and a spreading part configured to spread the foam on the application part. The spreading part is disposed at an angle with respect to the movement direction of the application part; and the supply opening, supplying the foam, is disposed near the most upstream portion of the spreading part with respect to the movement direction of the application part.

In another aspect, there is provided a foam application device for applying foam generated by foaming a liquid and/or a gel onto a target object. The foam application device includes an application part configured to apply the foam onto the target object; a supply opening configured to supply the foam to the application part; and a spreading part configured to spread the foam on the application part. The spreading part is disposed at an angle with respect to the movement direction of the application part; and the supply opening, supplying the foam, is disposed near the most upstream portion of the spreading part with respect to the movement direction of the application part.

DESCRIPTION OF THE PREFERRED EMBODIMENTS

Preferred embodiments of the present invention are described below with reference to the accompanying drawings.

In the present application, "foam" (may also be called "foamed liquid" or "foamed gel") indicates a liquid or a gel that is foamed (made into foam) before being applied to paper. In other words, "foam" indicates a compressible liquid or gel containing a large number of bubbles (mass of small bubbles). Also in the present application, "gel" indicates a semi-solid material where the independent mobility of a colloidal solution or a high polymer dispersed in a dispersion medium is lost because of interaction and its particles are connected with each other to form a solid mesh or a honeycomb structure.

Figure 1:
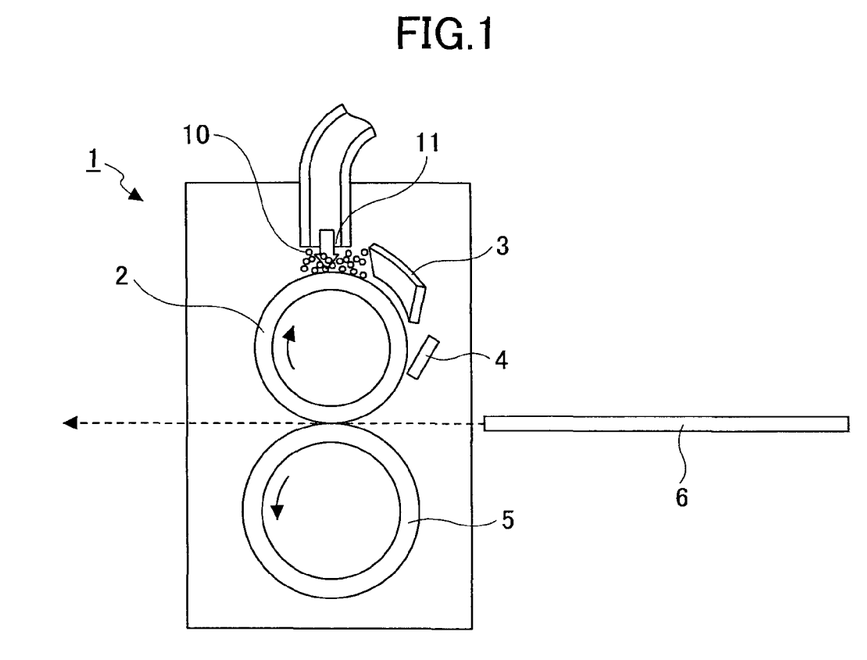
FIG. 1 is a schematic diagram illustrating a configuration of a foam application device according to a first embodiment of the present invention.
Figure 2:
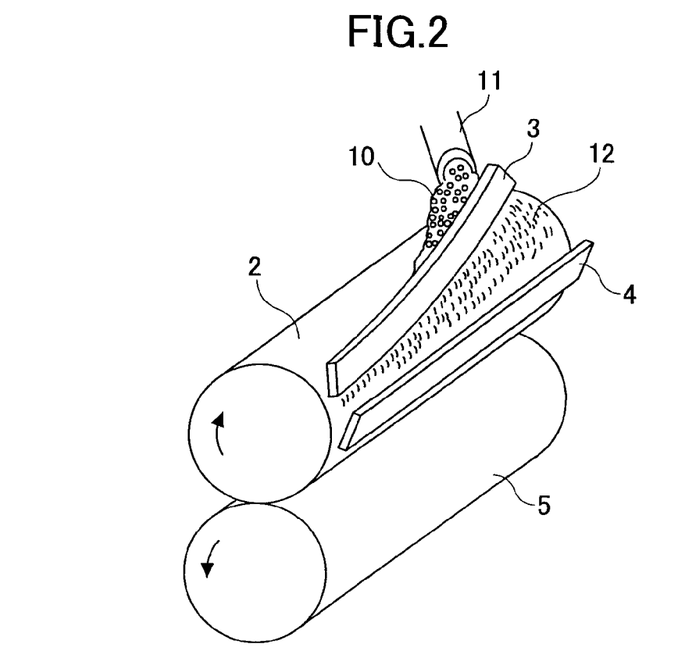
FIG. 2 is a partial perspective view of the foam application device of FIG. 1.

A foam application device 1 according to a first embodiment of the present invention is described below with reference to FIGS. 1 through 3. FIG. 1 is a schematic diagram illustrating a configuration of the foam application device 1; FIG. 2 is a partial perspective view of the foam application device 1; and FIG. 3 is an unfolded planar view of an application roller of the foam application device 1.

The foam application device 1 includes a supply opening 11 for supplying foam 10 that is a liquid and/or a gel (hereafter called a treatment liquid) caused to form fine bubbles; an application roller 2 that is an application part for carrying the foam 10 supplied from the supply opening 11 on its circumferential surface and rotates in the direction of the arrow; a spreading part 3 that is disposed downstream of the supply opening 11 with respect to the rotational direction of the application roller 2 and spreads the foam 10 on the surface of the application roller 2; a thickness control part 4 for controlling the thickness (layer thickness) of a layer of the foam 10 to be applied to a recording medium (target object) 6 by the circumferential surface of the application roller 2; and a feed assist roller 5 that is disposed to face the application roller 2 and rotates in the direction of the arrow to assist feeding of the recording medium 6.

The spreading part 3 is disposed at an angle with respect to the movement direction (rotational direction) of the application roller 2 and the supply opening 11 is disposed near the most upstream portion (the upper end) of the spreading part 3 (at the far side of FIG. 2) with respect to the movement direction of the application roller 2. The distance between the surface of the application roller 2 and the spreading part 3 is uniform in the width direction of application. The distance between the thickness control part 4 and the surface of the application roller 2 is less than the distance between the spreading part 3 and the surface of the application roller 2.

Figure 3:
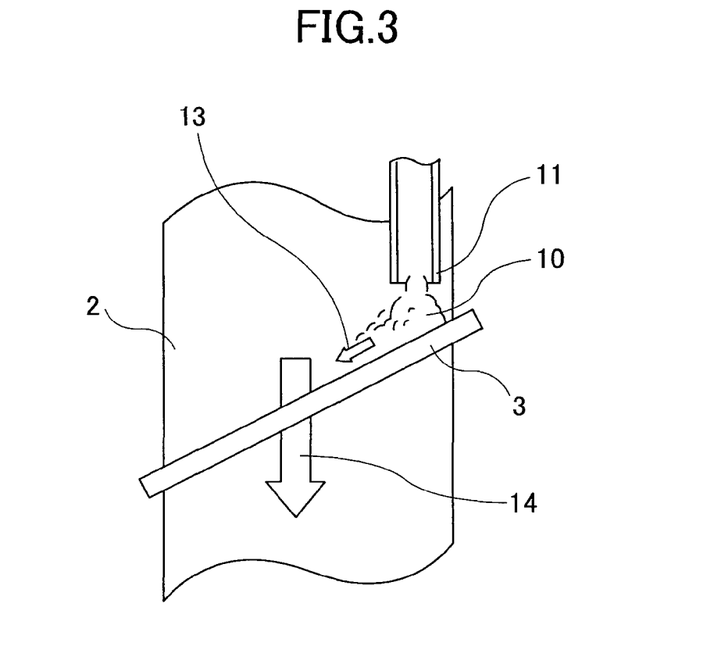
FIG. 3 is an unfolded planar view of an application roller of the foam application device of FIG. 1.

With the above configuration, when the foam 10 is supplied as shown by the arrow from the supply opening 11 to a position near the most upstream portion of the spreading part 3, the application roller 2 rotates in the direction of the arrow (arrow 14 in FIG. 3) and causes the foam 10 to move toward the near side of FIGS. 1 and 2 along the slope of the spreading part 3 as indicated by arrow 13 of FIG. 3. As a result, the foam 10 is spread in the width direction of the recording medium 6. Then, the foam 10 passes through a gap between the spreading part 3 and the application roller 2, and thereby forms a layer 12 (FIG. 2) with a uniform thickness on the surface of the application roller 2. Because the distance between the surface of the application roller 2 and the spreading part 3 is uniform in the width direction of application, the thickness of the foam 10 becomes uniform in the width direction of application.

As the application roller 2 rotates further, the thickness of the foam 10 on the application roller 2 is adjusted by the thickness control part 4 to a uniform layer thickness. Then, the foam 10 is transferred or applied to the surface of the recording medium 6 being fed in the direction of the arrow in FIG. 1 between the application roller 2 and the feed assist roller 5. After the foam 10 is applied, the recording medium 6 is forwarded to the next process.

As described above, a foam application device according to the first embodiment includes a supply opening for supplying foam, an application part for applying the foam, and a spreading part for spreading the foam; the spreading part is disposed at an angle with respect to the movement direction of the application part; and the supply opening is disposed near the most upstream portion of the spreading part. With this configuration, the foam is spread by the application part along the slope of the spreading part in the width direction of application, and the thickness of the foam is made uniform by the gap between the application part and the spreading part. Thus, this configuration makes it possible to form a layer of a foamed liquid or gel with a uniform thickness.

In the above embodiment, the application part applies the foam to the recording medium. Alternatively, the foam application device may include an intermediate part (e.g., an intermediate roller) disposed between the application part and the recording medium and configured to apply the foam to the recording medium, and the application part may be configured to apply the foam to the intermediate part.

Figure 4:
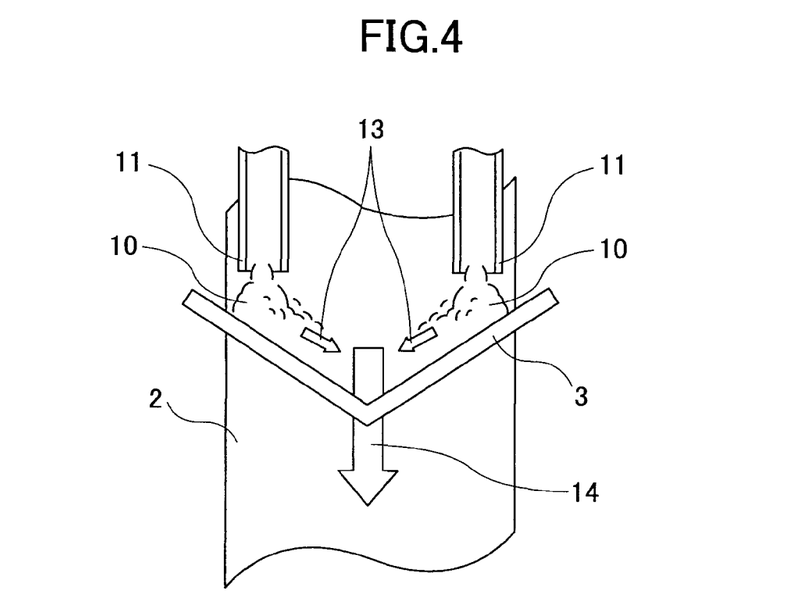
FIG. 4 is an unfolded planar view of an application roller of a foam application device according to a second embodiment of the present invention.

A foam application device according to a second embodiment of the present invention is described below with reference to FIG. 4. FIG. 4 is an unfolded planar view of an application roller of the foam application device of the second embodiment.

According to the second embodiment, the spreading part 3 has a symmetrical shape with respect to the center in the width direction (or the axis direction) of the application roller 2 and the two halves of the spreading part 3 are at symmetrical angles with the movement direction of the application roller 2. The ends of the spreading part 3 are placed in higher positions near the sides in the width direction of the application roller 2 and the center portion of the spreading part 3 is placed in a lower position near the center in the width direction of the application roller 2. Two supply openings 11 are disposed near the most upstream portions (the ends) of the spreading part 3.

With this configuration, when the application roller 2 rotates in the direction of arrow 14, the foam 10 is spread in the directions of arrows 13, i.e., toward the center in the width direction of the application roller 2. Compared with the first embodiment, this configuration makes it possible to reduce the time necessary to spread the foam 10 across the width of the application roller 2.

Figure 5:
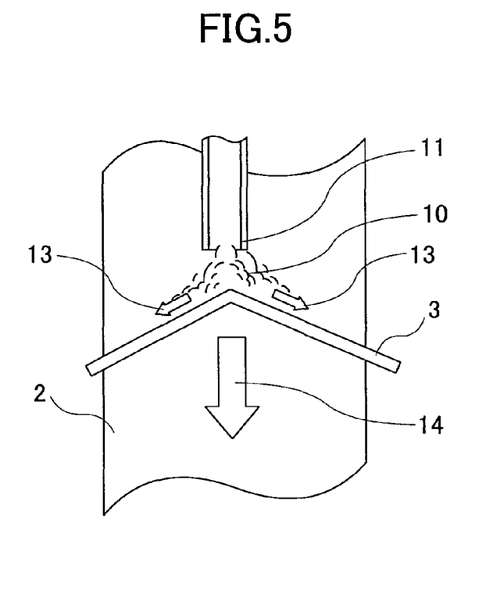
FIG. 5 is an unfolded planar view of an application roller of a foam application device according to a third embodiment of the present invention.

A foam application device according to a third embodiment of the present invention is described below with reference to FIG. 5. FIG. 5 is an unfolded planar view of an application roller of the foam application device of the third embodiment.

According to the third embodiment, the spreading part 3 has a symmetrical shape with respect to the center in the width direction (or the axis direction) of the application roller 2. In this embodiment, the center portion of the spreading part 3 is placed in a higher position near the center in the width direction of the application roller 2 and the ends of the spreading part 3 are placed in lower positions near the sides in the width direction of the application roller 2. The supply opening 11 is disposed near the most upstream portion (the center portion) of the spreading part 3.

With this configuration, when the application roller 2 rotates in the direction of arrow 14, the foam 10 is spread in the directions of arrows 13, i.e., toward the sides in the width direction of the application roller 2. Compared with the first embodiment, this configuration makes it possible to reduce the time necessary to spread the foam 10 across the width of the application roller 2.

The spreading part 3 may have various shapes other than those described in the above embodiments, and similar effects may be obtained by placing the supply opening(s) 11 near the most upstream portion(s) of the spreading part 3.

Figure 6:
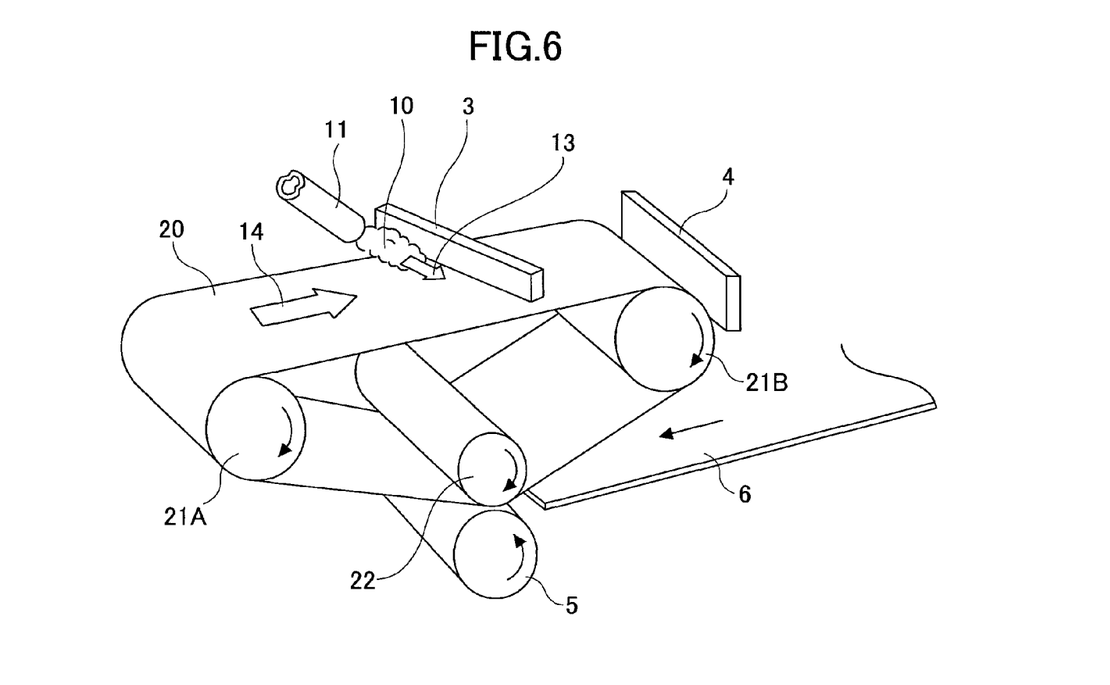
FIG. 6 is a perspective view of a foam application device according to a fourth embodiment of the present invention.

A foam application device according to a fourth embodiment of the present invention is described below with reference to FIG. 6. FIG. 6 is a perspective view of the foam application device of the fourth embodiment.

In the fourth embodiment, a belt-shaped part is used as an application part instead of an application roller. The foam application device of the fourth embodiment includes an application belt 20 that is stretched around rollers 21A and 21B and a pressure roller 22 and rotates in the direction of arrow 14. A spreading part 3 is disposed above the application belt 20 at an angle with respect to the movement direction of the application belt 20. A supply opening 11 is disposed near the most upstream portion of the spreading part 3 with respect to the movement direction of the application belt 20.

Also, a thickness control part 4 is disposed to face the roller 21B positioned downstream of the spreading part 3. The distance between the thickness control part 4 and the surface of the application belt 20 is less than the distance between the spreading part 3 and the surface of the application belt 20.

Further, a driven roller 5 for assisting feeding of a recording medium 6 is disposed to face the pressure roller 22 across the application belt 20.

When the application belt 20 rotates in the direction of arrow 14, the foam 10 is spread along the slope of the spreading part 3 toward the near side in FIG. 6 (in the direction of arrow 13), and the thickness of the foam 10 is made uniform by the gap between the spreading part 3 and the application belt 20. Then, the thickness of the foam 10 is reduced by the thickness control part 4 positioned downstream of the spreading part 3. The recording medium 6 is fed into the foam application device in the direction of the arrow and is forwarded to the next process after the foam 10 is applied to its surface.

Using a belt-shaped part instead of a roller-like part as an application part makes it possible to simplify the shape of a spreading part. When a roller-like part is used, it is necessary to shape a spreading part to curve around the circumferential surface of the roller-like part. On the other hand, when a belt-shaped part is used, a flat-plate spreading part can be used.

Figure 7:
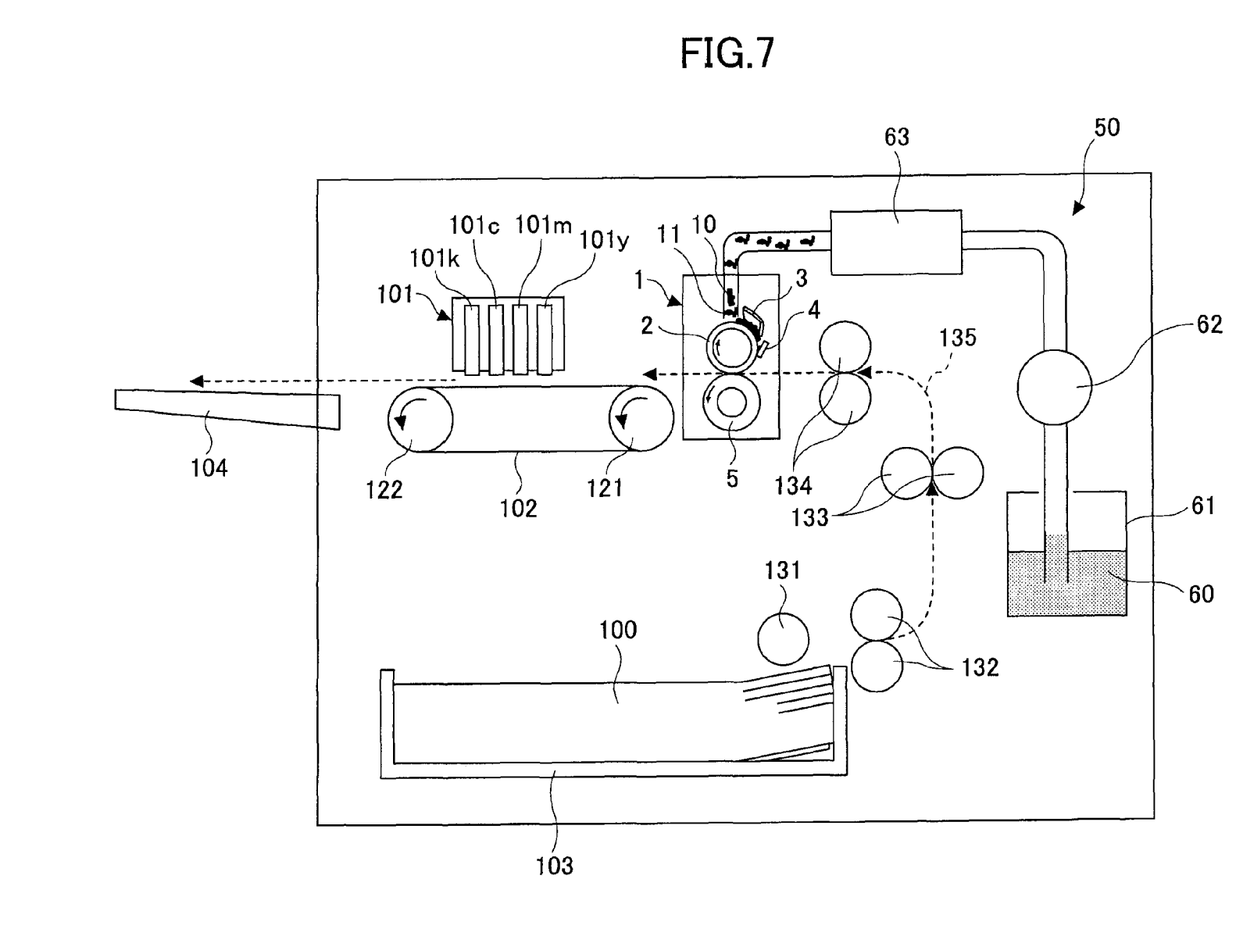
FIG. 7 is a schematic diagram illustrating a configuration of an inkjet recording apparatus according to an embodiment of the present invention.

An inkjet recording apparatus as an example of an image forming apparatus according to an embodiment of the present invention is described below with reference to FIG. 7.

The inkjet recording apparatus of this embodiment includes a recording head unit 101 for forming an image by jetting liquid droplets onto paper 100 used as a recording medium; a conveyor belt 102 for conveying the paper 100, a paper-feed tray 103 for containing the paper 100, and the foam application device 1 according to embodiments of the present invention. The foam application device 1 is disposed upstream of the recording head unit 101 with respect to the paper conveying direction and applies the foam 10 to the paper 100.

The recording head unit 101 includes line-type liquid-jet heads each including an array of nozzles that are arranged across the paper width and jet liquid droplets. The line-type liquid-jet heads include recording heads 101$y$, 101$m$, 101$c$, and 101$k$ that jet yellow (Y), magenta (M), cyan (C), and black (K) ink droplets, respectively. Alternatively, the inkjet recording apparatus of this embodiment may be configured as a serial-type image forming apparatus including a recording head unit mounted on a carriage.

The conveyor belt 102 is an endless belt and is stretched between a conveying roller 121 and a tension roller 122. The conveyor belt 102 rotates to convey the paper 100. The paper 100 is held on the conveyor belt 102, for example, by electrostatic attraction, air suction, or any other known method.

Sheets of the paper 100 in the paper-feed tray 103 are separated and fed one by one by a pickup roller 131, conveyed through a conveying path 135 into the foam application device 1 by conveying roller pairs 132, 133, and 134 as indicated by a dotted line, and after the foam 10 is applied, fed onto the conveyor belt 102. The paper 100 is held on the conveyor belt 102, for example, by electrostatic attraction.

The foam 10 applied to the paper 100 quickly dries. Then, while the paper 100 is being conveyed by the rotation of the conveyor belt 102, the recording head unit 101 forms an image on the paper 100 by jetting ink droplets of respective colors. After the image is formed, the paper 100 is ejected onto a paper catch tray 104.

The inkjet recording apparatus of this embodiment also includes a foam generating device 50 for supplying the foam 10 to the foam application device 1. The foam generating device 50 includes a container 61 for containing a liquid and/or a gel (treatment liquid) 60 that is foamable, a pump 62 for pumping the treatment liquid 60 from the container 61, and a generating unit 63 for generating the foam 10 with a desired bubble diameter from the treatment liquid 60. The foam 10 generated by the generating unit 63 is supplied to the foam application device 1.

The foamable treatment liquid 60 is a modifying agent for modifying the surface of the paper 100. For example, the treatment liquid 60 is a fixative (setting agent). When applied evenly on the paper 100 (as described above, it is not necessarily made of "paper"), the treatment liquid 60 accelerates penetration of the moisture of ink into the paper 100 and thereby thickens the color component; accelerates the drying of ink and thereby prevents blurs (feathering and bleeding) and show-through; and makes it possible to improve the productivity (the number of printed pages per unit time).

The treatment liquid 60, for example, is a solution including a surfactant (an anionic surfactant, a cationic surfactant, a nonionic surfactant, or a combination of two or more of them), a cellulose (e.g., hydroxypropylcellulose) for accelerating the penetration of moisture, and a base such as talc powder. The treatment liquid 60 may also include fine particles. The bubble content of the foam 10 is preferably between about 0.01 g/cm$^3$ and about 0.1 g/cm$^3$ in bulk density.

Using a foamed treatment liquid containing a large amount of air makes it possible to apply the treatment liquid in very small amounts. This in turn enables the treatment liquid to dry quickly and thereby makes it possible to form a high-quality image without blurs, show-through, and density variations.

Compared with a method where a treatment liquid is applied as is or in the form of a mist, applying a foamed treatment liquid has at least the following advantages:

(1) Because the foam contains a large amount of air, it is possible to apply the treatment liquid in very small amounts.

(2) Because the foam is similar to a solid, the thickness of a layer of foam can be easily adjusted by, for example, scraping the layer, and the foam separates easily from an application part when the foam is transferred from the application part to paper. This in turn makes it possible to uniformly apply the foam.

(3) Because moisture of foam does not easily penetrate into paper fibers, foam is less likely to cause paper to wrinkle or curl.

The above advantages of applying a foamed treatment liquid can be obtained regardless of the type of the treatment liquid. A treatment liquid used in the above embodiments preferably has an effect of suppressing generation of paper powder and may also have an effect of changing the background color of paper.

To apply foam to a recording medium, it is necessary to spread the foam supplied from a supply opening on an application part in advance to cover the width of the recording medium. Although a treatment liquid as is can be easily spread on an application part (because a liquid spontaneously spreads to some extent), a foamed treatment liquid does not spontaneously spread and therefore requires a spreading part.

For this reason, in the above embodiments, a spreading part designed taking into account the position(s) of a foam supply opening(s) is provided to spread the foam in the width direction of a target object (such as a recording medium) and to make uniform the thickness of the foam.

In the inkjet recording apparatus of the above embodiment, the foam application device 1 applies a foamed liquid to paper before an image is formed on the paper. Alternatively, the foam application device 1 may be disposed downstream of the recording head unit 101 and configured to apply a foamed liquid to paper after an image is formed on the paper. In the above embodiments, foam (foamed liquid) is generated from a foamable liquid and applied onto a target object. Alternatively, an image forming apparatus according to an embodiment of the present invention may include a device for generating foam (foamed gel) from a foamable gel and applying the foam onto a target object.

Also, a foam application device according to embodiments of the present invention may be used for an electrophotographic image forming apparatus. For example, the present invention may be applied to a fixing method, a fixing device, an image forming method, and an image forming apparatus where a foamed fixing solution is used to fix resin particles (e.g., toner) on a recording medium such as paper. In this case, the foamed fixing solution is applied to a recording medium to which resin particles are caused to adhere in such a manner that the resin particles are not disturbed. Preferably, the foamed fixing solution is able to be applied in very small amounts so that the recording medium does not become oily. After being applied, the fixing solution quickly fixes the resin particles to the recording medium.

Figure 8A:
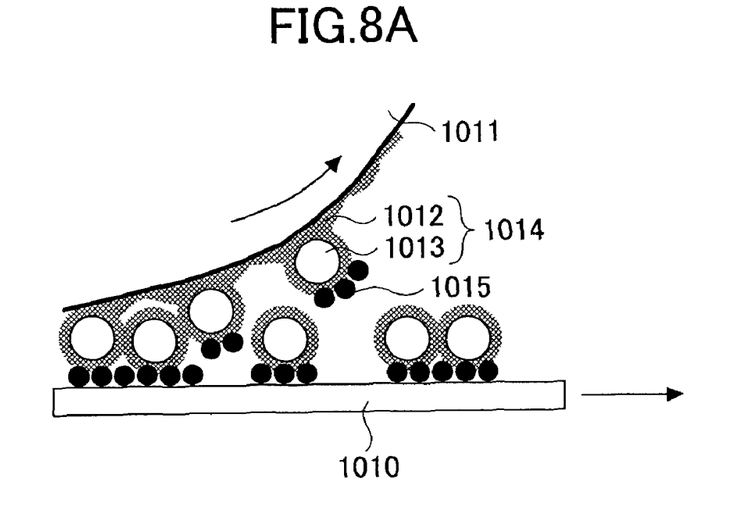
FIGS. 8A and 8B are enlarged views of a contact area where the surface of an application roller of an electrophotographic image forming apparatus touches unfixed resin particles and are provided to illustrate a case where the application roller is pressed against a recording medium at relatively high pressure.
Figure 8B:
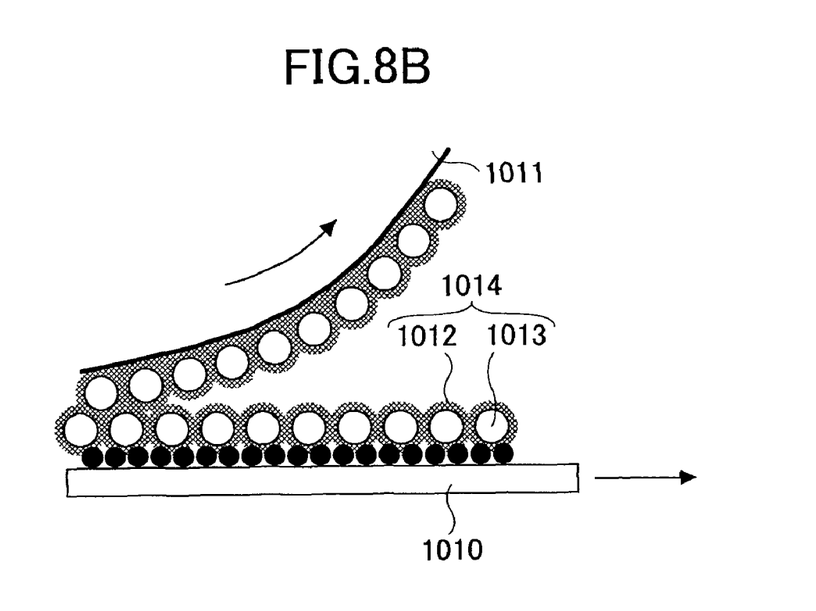
Figure 9A:
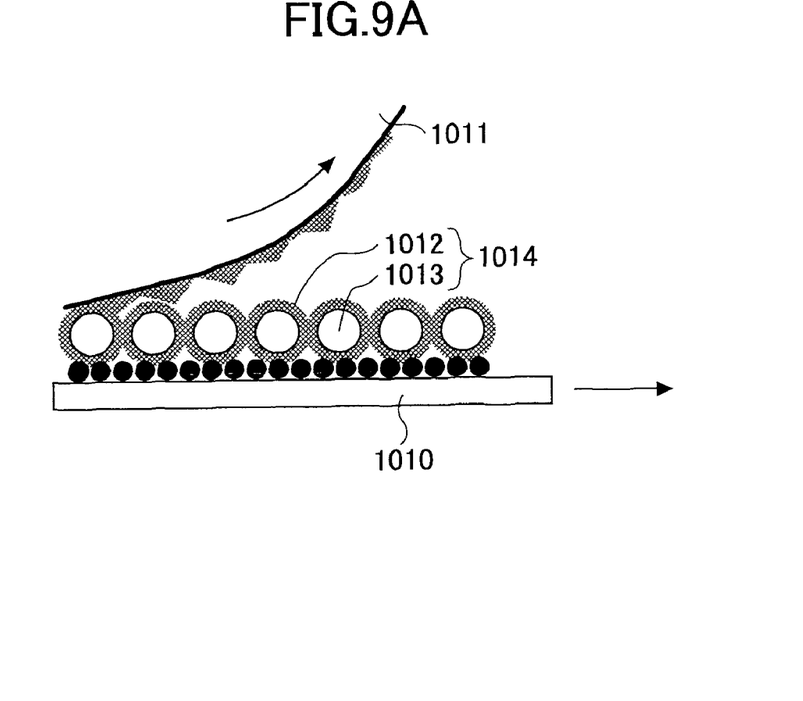
FIGS. 9A and 9B are enlarged views of a contact area where the surface of an application roller of an electrophotographic image forming apparatus touches unfixed resin particles and are provided to illustrate a case where the application roller is pressed against a recording medium at relatively low pressure.
Figure 9B:
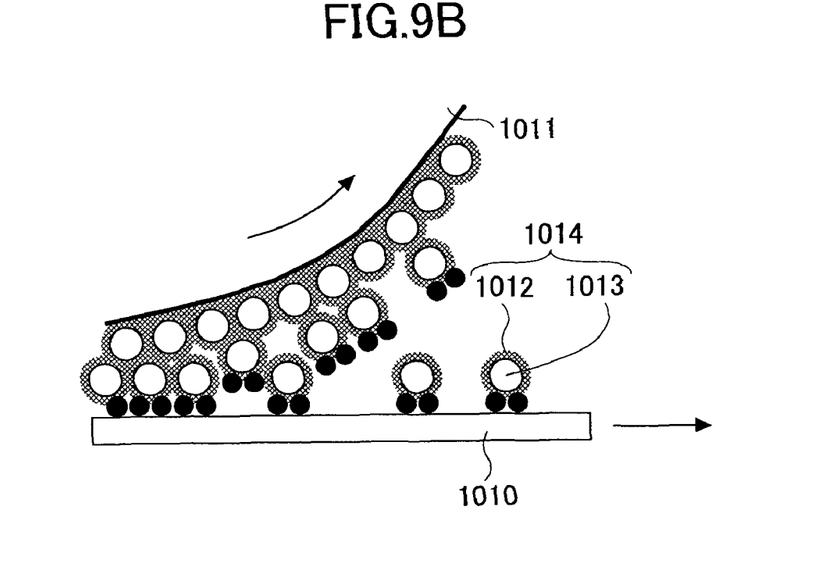

An exemplary electrophotographic image forming apparatus according to an embodiment of the present invention is described below with reference to FIGS. 8A through 9B. FIGS. 8A and 8B are enlarged views of a contact area where the surface of an application roller 1011 touches unfixed resin particles and are provided to illustrate a case where the application roller 1011 is pressed against a recording medium 1010 at relatively high pressure. FIGS. 9A and 9B are enlarged views of a contact area where the surface of the application roller 1011 touches unfixed resin particles and are provided to illustrate a case where the application roller 1011 is pressed against the recording medium 1010 at relatively low pressure. The application roller 1011 is rotated and the recording medium (target object) 1010 is moved in the directions of the respective arrows.

FIGS. 8A and 8B show examples where the application roller 1011 is pressed against the recording medium 1010 at relatively high pressure. In FIG. 8A, a single layer of bubbles 1013 is formed by a foamed fixing solution 1012 on the surface of the application roller 1011. This means that the thickness of the layer of the foamed fixing solution 1012 in FIG. 8A can be made smaller than that in FIG. 8B (where multiple layers of the bubbles 1013 are formed) because the diameters of the bubbles 1013 are the same in FIGS. 8A and 8B. However, in the case of FIG. 8A, because only one layer of the bubbles 1013 is formed, the bubbles 1013 tend to adhere to the surface of the application roller 1011 by surface tension and as a result, the fixing solution 1012 is unevenly applied over the layer of resin particles (unfixed toner) 1015 on the recording medium 1010. This in turn causes the resin particles 1015 to adhere to the bubbles 1013 and to be offset (transferred back) to the surface of the application roller 1011.

In the example shown in FIG. 8B, multiple layers of the bubbles 1013 are formed by the foamed fixing solution 1012 on the surface of the application roller 1011. In this case, the bubbles 1013 can fit in the rough layer of the unfixed toner 1015 and the layers of the bubbles 1013 of the foamed fixing solution 1012 can separate easily. Therefore, the foamed fixing solution 1012 can be uniformly applied over the toner layer and the toner offset can be greatly reduced.

Thus, when the application roller 1011 is pressed against the recording medium 1010 at high pressure, it is preferable to form multiple layers of the bubbles 1013 to prevent the offset of the unfixed toner 1015 to the application roller 1011. This can be done by measuring the average size of the bubbles 1013 and by adjusting the thickness of the layer of the foamed fixing solution 1012 on the application roller 1011 to accommodate multiple layers of the bubbles 1013.

FIGS. 9A and 9B show examples where the application roller 1011 is pressed against the recording medium 1010 at relatively low pressure. In FIG. 9A, a single layer of the bubbles 1013 is formed by the foamed fixing solution 1012 on the surface of the application roller 1011. In this case, the bubbles 1013 easily adhere to the rough layer of the unfixed toner 1015 and the layer of the bubbles 1013 smoothly separates from the surface of the application roller 1011. Therefore, the foamed fixing solution 1012 can be uniformly applied over the layer of the unfixed toner 1015.

In the example shown in FIG. 9B, multiple layers of the bubbles 1013 are formed by the foamed fixing solution 1012 on the surface of the application roller 1011. In this case, the bubbles 1013 tend to remain on the application roller 1011 because of the strong binding force between them, and the unfixed toner 1015 tends to adhere to the bubbles 1013 and is offset to the application roller 1011.

Thus, when the application roller 1011 is pressed against the recording medium 1010 at low pressure, the toner offset can be prevented by measuring the average size of the bubbles 1013 and by adjusting the thickness of the layer of the foamed fixing solution 1012 on the application roller 1011 such that only one layer of the bubbles 1013 is formed. Meanwhile, if the layer of the foamed fixing solution 1012 on the application roller 1011 is too thick, the layer of the bubbles 1013 may flow through the contact area between the application roller 1011 and the recording medium 1010. The flow in turn causes toner particles to move and thereby disturbs an image on the recording medium 1010. Therefore, it is preferable to limit the thickness of the layer of the foamed fixing solution 1012 within a range that does not cause the flow of the bubble layer.

As described above, it is possible to prevent the offset of toner to a contact application part such as an application roller, to prevent disturbance of an image, and to fix toner with a very small amount of foamed fixing solution by adjusting the thickness of a layer of the foamed fixing solution according to the size of bubbles in the foamed fixing solution and the degree of applied pressure.

In other words, in a process where a flexibilizer that softens resin particles by melting or swelling at least a part of the resin particles is used and the resin particles are fixed to a recording medium by applying a fixing solution to the resin particles with a contact application part such as an application roller, it is possible to prevent the offset of toner to the contact application part, to prevent disturbance of an image, and to fix toner with a very small amount of the fixing solution by using foam of the fixing solution and by adjusting the thickness of a layer of the foam according to the size of bubbles in the foam and the degree of applied pressure. The above method is particularly effective for toner particles used in electrophotography. Toner offset and disturbance of toner images can be prevented by adjusting the thickness of a layer of a foamed fixing solution according to the thickness of a layer of the toner particles.

Embodiments of the present invention provide a foam application device and an image forming device including the foam application device. The foam application device includes a supply opening for supplying foam, an application part for applying the foam, and a spreading part for spreading the foam. The spreading part is disposed at an angle with respect to the movement direction of the application part, and the supply opening is disposed near the most upstream portion of the spreading part with respect to the movement direction of the application part. With this configuration, the foam is spread by the application part along the slope of the spreading part in the width direction of application and the thickness of the foam is made uniform by the gap between the application part and the spreading part. Thus, this configuration makes it possible to apply a foamed liquid and/or a foamed gel with a uniform thickness.

The present invention is not limited to the specifically disclosed embodiments, and variations and modifications may be made without departing from the scope of the present invention.

The present application is based on Japanese Priority Application No. 2007-320912, filed on Dec. 12, 2007, the entire contents of which are hereby incorporated herein by reference.

What is claimed is:

1. An image forming apparatus, comprising:
    an image forming unit configured to form an image on a recording medium; and
    a foam application unit configured to apply foam generated by foaming a liquid and/or a gel onto the recording medium and including:
        a roller-like part configured to apply the foam onto the recording medium,
        a supply opening configured to supply the foam to the roller-like part, and
        a spreading part configured to spread the foam that is on the roller-like part; wherein
    the spreading part has a curved shape that curves along a circumferential surface of the roller-like part and is disposed at an angle with respect to a movement direction of the roller-like part; and
    the supply opening, supplying the foam, is disposed near the most upstream portion of the spreading part with respect to the movement direction of the roller-like part.

2. The image forming apparatus as claimed in claim 1, wherein
    the foam application unit further includes a foam thickness control part disposed downstream of the spreading part and configured to control the thickness of a layer of the foam on the roller-like part; and
    the distance between the foam thickness control part and the roller-like part is less than the distance between the spreading part and the roller-like part.

3. The image forming apparatus as claimed in claim 1, wherein
    the distance between a surface of the roller-like part and the spreading part is uniform in the width direction of application.

4. The image forming apparatus as claimed in claim 1, wherein
    the foam application unit further includes an intermediate part disposed between the roller-like part and the recording medium and configured to apply the foam onto the recording medium; and
    the roller-like part is configured to apply the foam onto the intermediate part.

5. The image forming apparatus as claimed in claim 1, wherein the foam application unit is configured to apply the foam onto the recording medium before the image is formed by the image forming unit.

6. The image forming apparatus as claimed in claim 1, wherein the foam application unit is configured to apply the foam onto the recording medium after the image is formed by the image forming unit.

7. A foam application device for applying foam generated by foaming a liquid and/or a gel onto a target object, comprising:
    an roller-like part configured to apply the foam onto the target object;
    a supply opening configured to supply the foam to the roller-like part; and
    a spreading part configured to spread the foam that is on the roller-like part; wherein
    the spreading part has a curved shape that curves along a circumferential surface of the roller-like part and is disposed at an angle with respect to a movement direction of the roller-like part; and
    the supply opening, supplying the foam, is disposed near the most upstream portion of the spreading part with respect to the movement direction of the roller-like part.

8. The foam application device as claimed in claim 7, further comprising a foam thickness control part disposed downstream of the spreading part and configured to control the thickness of a layer of the foam that is on the roller-like part.

9. The foam application device as claimed in claim 7, wherein a separation distance between a surface of the roller-like part and the spreading part is uniform in the width direction of application.

10. The foam application device as claimed in claim 7, wherein in a planar view of the spreading part and the roller-like part, the spreading part is not perpendicular to the movement direction of the roller-like part.

11. An image forming apparatus, comprising:
    an image forming unit configured to form an image on a recording medium; and a foam application unit configured to apply foam generated by foaming a liquid and/or a gel onto the recording medium and including:
   a belt-shaped part configured to apply the foam onto the recording medium,
   a supply opening configured to supply the foam to the belt-shaped part, and
   a spreading part configured to spread the foam that is on the belt-shaped part; wherein the spreading part is shaped like a flat plate and is disposed at an angle with respect to a movement direction of the belt-shaped part; and the supply opening, supplying the foam, is disposed near the most upstream portion of the spreading part with respect to the movement direction of the belt-shaped part.

\* \* \* \* \*